United States Patent
Thomaschewski (10) Patent No.: US 10,625,865 B2
(45) Date of Patent: Apr. 21, 2020

(54) AIRCRAFT SEAT AND METHOD FOR ADJUSTING AN AIRCRAFT SEAT

(71) Applicant: LUFTHANSA TECHNIK AG, Hamburg (DE)

(72) Inventor: Oliver Thomaschewski, Norderstedt (DE)

(73) Assignee: LUFTHANSA TECHNIK AG, Hamburg (GB)

( * ) Notice: Subject to any disclaimer, the term of this patent is extended or adjusted under 35 U.S.C. 154(b) by 170 days.

(21) Appl. No.: 15/575,520

(22) PCT Filed: May 18, 2016

(86) PCT No.: PCT/EP2016/061059
§ 371 (c)(1),
(2) Date: Nov. 20, 2017

(87) PCT Pub. No.: WO2016/184876
PCT Pub. Date: Nov. 24, 2016

(65) Prior Publication Data
US 2018/0155034 A1    Jun. 7, 2018

(30) Foreign Application Priority Data
May 18, 2015    (DE) .......................... 10 2015 209 075

(51) Int. Cl.
*B64D 11/06*        (2006.01)

(52) U.S. Cl.
CPC ........ *B64D 11/064* (2014.12); *B64D 11/0639* (2014.12); *B64D 11/0643* (2014.12); *B64D 11/0644* (2014.12)

(58) Field of Classification Search
None
See application file for complete search history.

(56) References Cited

U.S. PATENT DOCUMENTS 3,793,903 A * 2/1974 Pellman ................. B60N 2/231
                                                   74/531
6,659,562 B2 * 12/2003 Uchiyama ............ A47C 1/0242
                                                   297/217.3
(Continued)

FOREIGN PATENT DOCUMENTS

DE        600 06 419        8/2004
DE    10 2006 030 193        1/2008
(Continued)

OTHER PUBLICATIONS

International Search Report dated Aug. 19, 2016, for International Patent Application No. PCT/EP2016/061059 (published Application No. WO 2016/184876 A1), pp. 1-6.
(Continued)

*Primary Examiner* — Sarah B McPartlin
(74) *Attorney, Agent, or Firm* — Saliwanchik, Lloyd & Eisenschenk (57) ABSTRACT

Aircraft seat having a first seat element and a second seat element, the second seat element being mounted so as to be adjustable relative to the first seat element, a spring element that moves the second seat element relative to the first seat element being provided, it being possible for the force acting on the second seat element by the spring element to be released by an actuating element such that the spring element is deactivated in a first switching position of the actuating element, and the spring element is activated in a second switching position of the actuating element, where a force limitation element is provided, by which the force acting on the second seat element by the spring element can be limited to a predetermined value such that intermediate states between the first and the second switching positions can also be set.

11 Claims, 3 Drawing Sheets

(56) References Cited

U.S. PATENT DOCUMENTS

| | | | | |
|---|---|---|---|---|
| 6,814,410 B2* | 11/2004 | Piaulet | ................ | B60N 2/0232 |
| | | | | 297/361.1 |
| 7,997,654 B2* | 8/2011 | Ferry | ..................... | B60N 2/206 |
| | | | | 297/342 |
| 2006/0103212 A1* | 5/2006 | Waligora | ............. | B60N 2/2227 |
| | | | | 297/362.14 |
| 2015/0375865 A1* | 12/2015 | Fischer | ................. | B60N 2/919 |
| | | | | 701/49 |
| 2016/0167788 A1 | 6/2016 | Thomaschewski | | |

FOREIGN PATENT DOCUMENTS

| | | |
|---|---|---|
| DE | 10 2012 004 840 | 9/2013 |
| DE | 10 2013 212 976 | 1/2015 |
| EP | 2 602 189 | 6/2013 |
| WO | WO 02/16161 | 2/2002 |

OTHER PUBLICATIONS

First Examination Report issued by the German Patent and Trademark Office for German patent application No. 2015 209 075.2, dated Apr. 12, 2016.

\* cited by examiner

AIRCRAFT SEAT AND METHOD FOR ADJUSTING AN AIRCRAFT SEAT

CROSS-REFERENCE TO RELATED APPLICATIONS

The present application is the U.S. National Stage Application of International Patent Application No. PCT/EP2016/061059, filed on May 18, 2016, which claims priority to German Patent Application No. 10 2015 209 075.2, filed on May 18, 2015, both of which are hereby incorporated by reference herein in their entirety, including any figures, tables, or drawings.

The present invention relates to an aircraft seat and to a method for adjusting an aircraft seat.

Aircraft seats having adjustable seat elements, such as back rests, arm rests, leg rests or sitting surfaces, are generally known. The adjustment is a change in the relative position and/or orientation of two or more seat elements. This can include setting the angle of a back rest with respect to a sitting surface or raising the leg rest relative to the sitting surface, for example. A first seat element can be adjusted relative to a second seat element by being rotated about an axis, moved along an axis or adjusted along a path. Seat elements, in particular the sitting surface, are also adjusted relative to a seat base or a seat frame that is fastened to the cabin floor; within the meaning of this application, said elements are also intended to be considered as seat elements.

The adjustment of seat elements is made possible by adjustment devices that make it possible for two or more seat elements of an aircraft seat to move relative to one another within certain limits.

Aircraft seats having a normal level of comfort, which are intended for aircraft seating that is as dense as possible, typically comprise mechanical adjustment devices for seat elements, which devices a seated person can release from a blocked position by means of an operating lever or button. The operating lever is connected to the adjustment device and to a corresponding blocking element via cables, rods or hydraulic lines in order to mechanically transmit the unlocking force. Depending on the switching position, the blocking element can block or enable the movement of different seat elements relative to one another.

On account of the distances to be bridged between an operating lever, e.g. at the end of an arm rest, and an adjustment device, e.g. at the hinged joint between the sitting surface and the back rest, implementing the mechanical transmission of the unlocking force is complex. Furthermore, possible transitions between seat elements and changes in direction when force is transmitted at narrow radii, e.g. at the transition between an arm rest and a back rest, have to be bridged. Transitions of this kind may also be designed as a hinged joint, meaning that the mechanical transmission of force likewise has to be implemented hingedly in a complex manner and accordingly takes up a great deal of installation space, and this considerably restricts the design freedom for the aircraft seats.

Furthermore, mechanisms of this kind may be subject to considerable friction, and therefore they are stiff for a user to operate, in particular after a long operating life. Bowden cables or hydraulic systems, for example, can be used to mechanically transmit force.

DE 10 2013 212 976 A1 discloses an aircraft seat comprising an adjustment device in which an operating element is provided, the operating element being an electronic and/or electrical switch. The blocking element can thus be electronically operated by means of an actuator actuated by the operating element, such that means for mechanically transmitting force between the operating element and the blocking element can be dispensed with.

EP 2 602 189 A1 also discloses a seat system that makes it possible to electronically unlock an actuating drive such that the seat system can be adjusted into a position desired by the passenger.

The solutions known from the prior art therefore offer the option of either activating or deactivating the adjustment device. As a result, either a maximum adjustment force provided by the adjustment device acts on the seat element to be adjusted, or the adjustment force is completely deactivated. In the deactivated state, it is also not possible to adjust the seat element. The drawback of these known solutions is that, consequently, during an adjustment movement, the maximum force always acts on the seat element to be adjusted.

In contrast, there are aircraft seats that comprise electrically driven adjustment devices. These devices make it possible to adjust seat elements by means of actuating drives. The actuating drives are actuated electronically and can be controlled by a seated person by means of control keys. The angle of a back rest with respect to a sitting surface can thus be adjusted or changed electrically, for example. The actuating drives are designed such that one or more seat elements can also be adjusted against the weight of a seated person. The actuating drives also have to be designed such that, in the event of a crash, they can safely withstand the loads that arise. The servomotors are heavy and also expensive on account of these requirements. Furthermore, the required size of the servomotors restricts design freedom for an aircraft seat when said motors are integrated. If a plurality of adjustable seat elements are provided on an aircraft seat, it has to be ensured, in a complex manner, that no combination of positions of the seat elements can be assumed that could jam or injure a seated person.

The object of the invention is that of providing an aircraft seat comprising a spring element, and a method in which improved settability of the force acting on the adjustable sitting surface is possible.

The object is achieved by the features of the independent claims.

According to the basic concept of the invention, an aircraft seat having a first seat element and a second seat element is proposed, the second seat element being mounted so as to be adjustable relative to the first seat element, a spring element that moves the second seat element relative to the first seat element being provided, it being possible for the force acting on the second seat element by means of the spring element to be released by an actuating element such that the spring element is deactivated in a first switching position of the actuating element, and the spring element is activated in a second switching position of the actuating element, a force limitation element being provided, by means of which the force acting on the second seat element by means of the spring element can be limited to a predetermined value such that intermediate states between the first and second switching positions can also be set.

The spring element within the meaning of the invention is preferably understood to mean a gas pressure spring, more preferably a pressure accumulator, a spiral spring or generally a mechanical element having a restoring force. The spring element accumulates the energy that is exerted on the seat element when the seat element is adjusted in a first direction by the passenger. When the spring element is activated, the accumulated energy is then released again in order to assist a movement of the seat element in a second direction, counter to the first movement.

Preferably, the first seat element is a sitting surface, and the second seat element is a back rest, such that, when the spring element is activated, an uprighting movement of the passenger from a lying position into a sitting position can be assisted. The first and second seat elements can, however, also be formed by other seat elements, for example by an arm rest.

The spring element is preferably designed such that the passenger can, in a simple manner, override or apply pressure in excess of the force acting on the seat element. Nonetheless, the spring element has to have a sufficiently large maximum force $F_{max}$ in order to be able to carry out all the necessary adjustment movements, such as also the adjustment of a back rest from the lying position into the sitting position.

The solution according to the invention makes it possible for the adjustment force of the spring element to be able to assume any desired values which, in particular, can even be lower than the maximum force $F_{max}$ that the spring element can apply. These forces can also be set selectively between 0 and the maximum force $F_{max}$. Spring elements that are not designed or cannot be operated such that force values between 0 and the maximum force $F_{max}$ can be set without selective control, which may unintentionally be the case during the release movement of gas pressure springs when a release valve is opened, for example, are not intended to be considered to be according to the invention.

By means of the force limitation element, the force that the spring element exerts on the second seat element can be set so as to result in a movement behaviour of the seat element that is pleasant for the passenger. Here, the movement behaviour of adjustment movements having translational and/or rotational movement components can be set by the force limitation element. An example of a translational movement of a seat element is a height-adjustable head rest. On account of this settability, the passenger can be assisted by a predetermined force during an uprighting movement from a lying position into a sitting position, for example. However, at the same time it is also possible for a suitable counterforce to be set by means of the spring element during an adjustment movement from the sitting position into the lying position, resulting in a smooth movement into the lying position for the passenger, during which said passenger is also assisted by the force applied by the spring element. In other words, the passenger does not fall into the lying position on account of the force applied by the spring element. Preferably, the force limitation element can also be formed by a damping element.

Preferably, various force values can be set on the basis of on the adjustment movement of the first seat element relative to the second seat element. Movement behaviour of the adjustable seat elements which is of a high quality for the passenger can therefore be achieved by the solution according to the invention even without an electrically driven adjustment device.

It is also proposed for the force limitation element to be formed by the actuating element. A separate force limitation element can therefore be dispensed with. The actuating element is then preferably designed such that only one predetermined force having any desired values of from 0 to $F_{max}$ can be released by the spring element. When a gas pressure spring is used as the spring element, the actuating element is preferably formed by a release valve such that the force acting on the seat element by means of the spring element can be set according to the position of the release valve, by means of which a first gas pressure chamber can preferably be connected to a second gas pressure chamber of the gas pressure spring. In a preferred embodiment, the release valve of the gas pressure spring is controlled by a servomotor. For this purpose, a servomotor from the model making field, for example, can preferably be used as a reliable and cost-effective solution.

It is also proposed for a movement of the first seat element relative to the second seat element to be blocked in the first switching position of the actuating element.

This means that, in a second switching position, a set value of the spring element acts on the second seat element. In the first switching position, the second seat element is locked with respect to the first seat element such that unwanted adjustment is prevented.

The second seat element is blocked with respect to the first seat element preferably by means of the force limitation element. If the force limitation element is formed by the actuating element, for example by the release valve of a gas pressure spring, the locking takes place automatically in the first switching position, in which the release valve preferably prevents a fluid from overflowing from the first gas pressure chamber into the second gas pressure chamber. Although the gas pressure spring does not exert any force on the second seat element, no adjustment can be made either, which results in the second seat element being locked with respect to the first seat element.

An additional securing device is also proposed, by means of which the movement of the second seat element relative to the first seat element can be blocked.

As a result, reliable locking can be achieved when the force limitation element and/or the spring element is not designed to prevent the first seat element from moving relative to the second seat element. The additional securing device can, however, also be provided as a redundant securing device.

Preferably, the force limitation element is designed to act counter to the force acting on the second seat element by means of the spring element.

The force limitation element is preferably formed by a braking element that acts counter to the axial movement of the spring element. Alternatively, the spring element may also be formed by two or more sub-spring elements, at least two sub-spring elements being designed such that they act counter to one another. More preferably, the spring elements that act counter to one another can be activated or deactivated in groups or in isolation such that the force acting on the seat element can be set.

It is also proposed for the force limitation element to be electrically operable by means of an operating unit.

A mechanical, hydraulic and/or pneumatic operating device can thus be dispensed with. On account of the electronic operation of the force limitation element, just one cable has to be laid between the operating unit and the force limitation element. Alternatively, wireless operation of the force limitation element is also possible. Unlike in the case of mechanical operation via a Bowden cable, for example, it is thus not necessary to adhere to minimum radii, for example, and therefore the design of the aircraft seat is not influenced and or only marginally influenced. Furthermore, practically any desired arrangement of the operating unit on the aircraft seat is possible.

An electronic open-loop and/or closed-loop control unit is also preferably provided, which is designed to operate the force limitation element.

This makes it possible to control, in an open-loop and/or closed-loop manner, the adjustment behaviour of the second seat element relative to the first seat element on the basis of one or more state variables. The electronic open-loop and/or closed-loop control unit is preferably formed by a microcontroller.

It is also advantageous for the open-loop and/or closed-loop control unit to be connected to at least one sensor that captures state variables of the aircraft seat, the sensor preferably being formed by an angle sensor, a travel sensor, a force sensor and/or an acceleration sensor. The angle sensor is preferably formed by a rotary potentiometer.

As a result, state variables of the aircraft seat, for example the relative angle or distance of two seat elements with respect to one another, can be determined in a simple manner. Preferably, an angle sensor can be used to measure an adjustment angle of a back rest relative to a sitting surface. A sensor of this kind makes it possible to also determine the rotational speed and/or the rotational acceleration during an adjustment movement of the back rest relative to the sitting surface.

Preferably, the open-loop and/or closed-loop control unit comprises an interface for receiving external signals. Signals from the aircraft, for example, can thus be received, which signals can be analysed by the open-loop and/or closed-loop control unit. A signal can thus be sent from the aircraft to the open-loop and/or closed-loop control unit in the event of turbulences or during the start-up phase and/or landing phase, for example. Said signal is then processed by the open-loop and/or closed-loop control unit, and the force element is operated such that it is no longer possible for the second seat element to be adjusted relative to the first seat element.

Furthermore, the open-loop and/or closed-loop control unit can preferably also be connected to an acceleration sensor such that the closed-loop and/or open-loop control unit can automatically detect when there is a critical flight state.

It is also proposed for the force limitation element to be operable by means of the open-loop and/or closed-loop control unit on the basis of the adjustment position, the adjustment speed and/or the adjustment acceleration of the second seat element.

The force limitation element can therefore be operated on the basis of an operating state of the aircraft seat such that the force acting, by means of the spring element, on the seat element to be adjusted can be set on the basis of the adjustment position and/or the adjustment speed.

Preferably, in the case of a rotational adjustment movement of the back rest relative to the sitting surface, settability of the force limitation element can be achieved on the basis of the adjustment angle of the back rest with respect to the sitting surface. This is advantageous because, for example during an adjustment movement of the back rest from a lying position into a sitting position, a high force of the spring element is required at the beginning of the adjustment movement. This results from the difficulty, as explained at the outset, of a small lever arm in the lying position and from the large force $F_1$ which acts on the back rest and which is brought about by the weight of the passenger and/or the back rest itself. As the back rest is set increasingly upright into the sitting position, the lever arm increases, meaning that, in order to achieve the same torque, the spring element has to supply a smaller force than in the lying position.

These requirements for the force profile of the spring element can be accommodated by operating the force limitation element on the basis of the adjustment angle. This dependency of the operation of the force limitation element on an adjustment position can also be applied to any other desired seat elements to be adjusted, for example arm rests, leg rests or sitting surfaces. Here the adjustment movement can have translational and/or rotational movement components.

It is also possible to control the force limitation element on the basis of the adjustment speed. In this case, a maximum adjustment speed can be defined, for example. More preferably, the maximum value for the adjustment speed can also be specified on the basis of the adjustment position. Preferably, the maximum value for the adjustment speed is as low as possible shortly before a final position of the seat element, for example the lying or sitting position, is reached, meaning that the seat element can be prevented from coming to a stop in the final position in a manner that is unpleasant for the passenger.

It is also advantageous for the interface to be connected to a proximity sensor. The proximity sensor is preferably a sensor by means of which an imminent collision of the moving seat element with obstacles in the surroundings can be detected. The adjustable seat element can thus be prevented from colliding with a passenger, for example. The proximity sensor is preferably formed by an ultrasound sensor.

It is also proposed for the force limitation element to be operable by means of the open-loop and/or closed-loop control unit such that the spring element can only move in a predefinable direction.

The operating element is preferably used to set the movement direction in which the passenger would like to adjust the second seat element relative to the first seat element; this information is then transmitted to the open-loop and/or closed-loop control unit and processed therein. Preferably, the angle sensor is used to detect the movement direction. Alternatively or additionally, the detection can also take place by means of an acceleration sensor.

Preferably, the open-loop and/or closed-loop control unit can in this case check whether the actual movement direction matches the movement direction that has been set. If that is the case, the force limitation element functions such that it is possible for the second seat element to be adjusted relative to the first seat element while a set force of the spring element is applied. If the open-loop and/or closed-loop control unit detects that the actual movement direction differs from the preselected movement direction, the force limitation element is preferably operated such that the second seat element can no longer move relative to the first seat element. Alternatively, the adjustment movement of the first seat element relative to the second seat element can also be prevented by the additional securing device. It can thus be ensured that the second seat element can only be adjusted in the preselected direction.

Furthermore, the direction-dependent operation preferably can be utilised, when there is an external signal that indicates a critical flight state, to allow only an adjustment movement of the particular seat element into a safe sitting position. For the example of the back rest that can be adjusted relative to the sitting surface, this could be an adjustment movement that is possible only towards the sitting position. As soon as the sitting position has been reached, the back rest is locked with respect to the sitting surface.

According to the invention, a method for adjusting an aircraft seat having a first and a second seat element is also proposed, the second seat element being mounted so as to be adjustable relative to the first seat element, a spring element that moves the second seat element relative to the first seat element being provided, the force acting on the second seat element by means of the spring element being released by an actuating element such that the spring element is deactivated in a first switching position of the actuating element, and the spring element is activated in a second switching position of the actuating element, the force acting on the second seat element by means of the spring element being limited to a predetermined value such that intermediate states between the first and second switching positions can also be set.

On account of said method, an adjustment characteristic of the adjustable seat elements is achieved that is pleasant for the passenger. This can also by achieved, for example, by the spring element being formed by a plurality of sub-spring elements which are arranged in the same direction in a series or parallel connection. This means that, when activated separately, said sub-spring elements would bring about movement of the second seat element in the identical direction. On account of it being possible to activate and deactivate the sub-spring elements in groups or in isolation, settability of the total spring force acting on the seat element to be adjusted can therefore be achieved.

An aircraft seat having a first and a second seat element is also proposed, the second seat element being mounted so as to be adjustable relative to the first seat element, a force limitation and/or damping element being provided, by means of which an external force acting on the second seat element can be counteracted. In this case, the force limitation and/or damping element can preferably be controlled such that the force acting on the second seat element by means of the passenger can be counteracted by means of a settable application of force.

Within the meaning of this application, an external force is understood to mean a force that is not brought about by an adjustment device, for example by an actuation element, but rather a force that preferably acts on the seat element by means of a passenger or by gravity.

A spring element is dispensed with entirely in this case because the second seat element can also be mounted with respect to the first seat element such that the adjustment movement does not take place by means of the assistance of the spring element or counter to the force of the spring element. In this case, an unwanted excessively fast adjustment movement can still be prevented by the force limitation element, for example. This may be advantageous, for example, if a height-adjustable arm rest moves downwards too quickly due to gravity when a passenger lets go of said arm rest. This negative effect can be remedied by a force limitation element which can preferably also be actuated on the basis of the adjustment movement.

The above-described features concerning the open-loop and/or closed-loop control of the force limitation element for the case comprising a spring element are expressly intended to be included in the disclosure of the embodiment of an aircraft seat that comprises a force limitation element but not a spring element.

The invention is described below on the basis of preferred embodiments and with reference to the accompanying drawings, in which.

Figure 1:
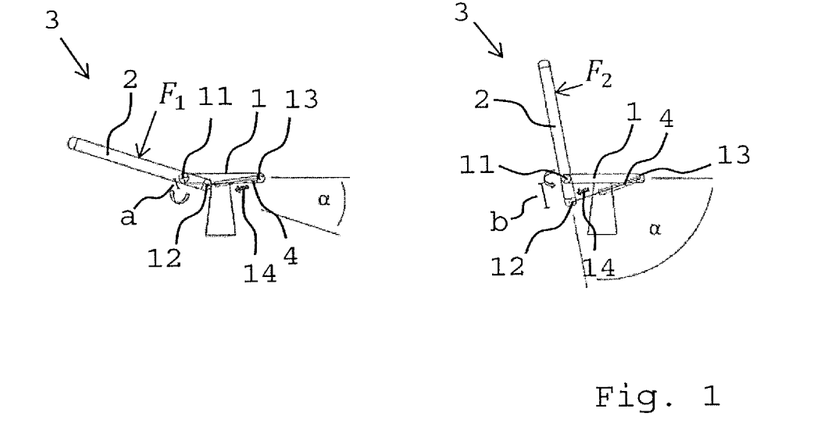
FIG. 1 shows an aircraft seat according to the invention in a lying position (left-hand side) and in a sitting position (right-hand side)

FIG. 1 shows an aircraft seat 3 according to the invention in a lying position (left-hand side) and in a sitting position (right-hand side). The aircraft seat 3 according to the invention comprises a first seat element 1, which is preferably formed by a sitting surface, and a second seat element 2, which is preferably formed by a back rest. Any other desired seat elements 2, 3 that can be moved relative to one another are, however, also intended to be included in disclosure of this application.

The second seat element 2 is rotationally mounted with respect to the first seat element 1 by means of a rotary joint 11. A spring element 4 is also provided that is preferably formed by a gas pressure spring. Alternatively, the spring element 4 may preferably also be formed by a pressure accumulator, a spiral spring or generally a mechanical element having a restoring force. The spring element 4 is connected to the second seat element 2 at a first attachment point 12, and is connected to the first seat element 1 at a second attachment point 13. The spring element 4 is designed such that, when activated, it exerts an axial force on the first attachment point 12 in the direction of an arrow 14.

FIG. 1 also shows forces $F_1$ and $F_2$, which result from a weight of a passenger sitting in the aircraft seat 3 and/or from the weight of the second seat element 2. It is clear from the view in FIG. 1 that the force $F_1$ in the lying position (left-hand side) is greater than the force $F_2$ in the sitting position (right-hand side).

FIG. 1 also shows the lengths a and b of the lever arms of a force acting, by means of the spring element 4, with respect to the rotary joint 11 at the first attachment point 12. On account of the characteristic of the adjustment mechanism shown, the length of the lever arm a in the lying position (left-hand side) is smaller than the length of the lever arm b in the sitting position (right-hand side).

Owing to the greater force $F_1$ and the smaller length of the lever arm a, which results in a lower torque for adjusting the second seat element 2 when the spring element 4 applies the same force to the first attachment point 12, the spring element 4 has to apply a greater force to the first attachment point 12 in the lying position than in the sitting position. This therefore results in variable requirements for the force applied by the spring element 4, on the basis of the angle α, which indicates the angle between the first seat element 1 and the second seat element 2.

The force applied by the spring element 4 on the first attachment element 12 can therefore be operated by means of a force limitation element 6 (see FIG. 2 to FIG. 4), preferably on the basis of the angle α. For this purpose, a sensor 9 (see FIG. 2 to FIG. 4), preferably an angle sensor 22, is provided on the rotary joint 11, which sensor is designed to detect the angle α.

Figure 2:
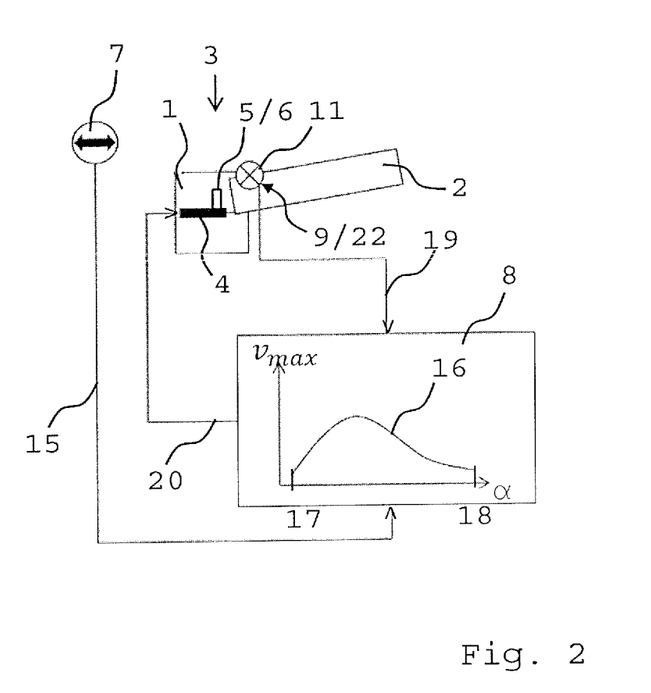
FIG. 2 shows an aircraft seat according to the invention having a direction-independent operating unit.

FIG. 2 shows a schematic embodiment of the aircraft seat 3 according to the invention. As in FIG. 1, FIG. 2 shows the first seat element 1 that can be rotated relative to the second seat element 2 by means of the rotary joint 11. Preferably, the angle sensor 22 is provided in spatial proximity to the rotary joint 11 in order to detect the angle α between the first and the second seat element 1 and 2. The angle sensor 22 is preferably formed by a rotary potentiometer. Alternatively or additionally, a travel sensor that measures the axial adjustment range of the spring element 4, for example, may also be provided.

Lastly, the spring element 4 formed by the gas pressure spring is also shown schematically, which spring element comprises an actuating element 5. The spring element 4 can be operated by the actuating element 5. Preferably, the spring element 4 is formed by a release valve, by means of which a first and a second gas pressure chamber of the gas pressure spring can be interconnected.

The force limitation element 6 is formed by the release valve itself. Therefore, a separate force limitation element 6 can be dispensed with. In a first switching position of the actuating element 5, the spring element 4 is deactivated. This means that the first and second gas pressure chambers are fluidically separated from one another. Consequently, no axial force acts on the first attachment point 12 (see FIG. 1) by means of the spring element 4. The fluidic separation of the first gas pressure chamber from the second gas pressure chamber prevents unwanted adjustment of the spring element 4, and therefore the second seat element 2 is locked with respect to the first seat element 1. Preferably, an additional securing device is provided, by means of which unwanted adjustment of the second seat element 2 relative to the first seat element 1 can be prevented.

The force limitation element 6 can be operated by means of an open-loop and/or closed-loop control unit 8, the passenger being able to actuate the open-loop and/or closed-loop control unit 8 by means of an operating unit 7. The open-loop and/or closed-loop control unit 8 is preferably formed by a microcontroller. In this embodiment, by operating the operating unit 7 the passenger can generate a signal that is transmitted to the open-loop and/or closed-loop control unit 8 via an electronic connection 15. By operating the operating element 7, an adjustment movement of the second seat element 2 can thus be enabled, for example.

Preferably, a function is stored on a data store of the open-loop and/or closed-loop control unit 8, which function indicates a maximum adjustment speed $V_{max}$ as a function of the adjustment angle $\alpha$. This is shown schematically in FIG. 2 by a speed curve 16 that represents a maximum permissible speed $V_{max}$ as a function of the adjustment angle $\alpha$. It should be pointed out that the label $V_{max}$ is used here to represent both translational and rotational speeds. On the axis of abscissas, the angle $\alpha$ for a sitting final stop position 17 of the second seat element 2 is plotted on the left-hand side, and the angle $\alpha$ for a lying final stop position 18 of said second seat element is plotted on the right-hand side. It can be seen from the progression of the speed curve that, as the stop positions 17 and 18 are approached, the maximum permissible speed $V_{max}$ decreases, and therefore the second seat element 2 can be prevented from coming to a hard stop in the final stop positions 17 and 18. In an alternative embodiment, the open-loop and/or closed-loop control of the adjustment movement may preferably also take place on the basis of an acceleration curve that indicates the maximum permissible accelerations as a function of the adjustment angle $\alpha$.

The angle sensor 22 forms, within the meaning of control engineering, a measuring component and is preferably designed to measure the adjustment angle $\alpha$ as a function of time, such that the speed and/or the acceleration of the adjustment movement can also be established by means of the open-loop and/or closed-loop control unit 8 by derivation with respect to time. In an alternative embodiment, the sensor 9 may also be designed to directly supply the adjustment speed and/or the adjustment acceleration to the open-loop and/or closed-loop control unit 8 as measured variables. The signals from the angle sensor 22 are transmitted via an electronic connection 19.

The open-loop and/or closed-loop control unit 8 is designed to compare the actual speed with the maximum permissible adjustment speed $V_{max}$ and to operate the force limitation element 6 accordingly via an electronic connection 20. If, as in this embodiment, the force limitation element 6 is formed by the actuating element 5, a corresponding manipulated variable is preferably transmitted from the open-loop and/or closed-loop control unit 8 to a servomotor via the electronic connection 20 if the maximum permissible adjustment speed $V_{max}$ is exceeded, which servomotor is operatively connected to the release valve and is therefore designed to determine the switching position of the release valve.

If the passenger has set the desired position of the second seat element 2, this information is transmitted to the open-loop and/or closed-loop control unit 8 by the passenger by means of the operating unit 7, and this leads to a signal being transmitted from the open-loop and/or closed-loop control unit 8 via the electronic connection 20 such that the actuating element 5 is brought into the deactivated switching position and the second seat element 2 is thereby locked with respect to the first seat element 1.

Furthermore, the open-loop and/or closed-loop control unit 8 may also be designed purely as an open-loop control unit. In this case, the electronic connection 19 can be dispensed with, and the force limitation element 6 can be controlled on the basis of a switching position of the operating unit 7, for example.

Figure 3:
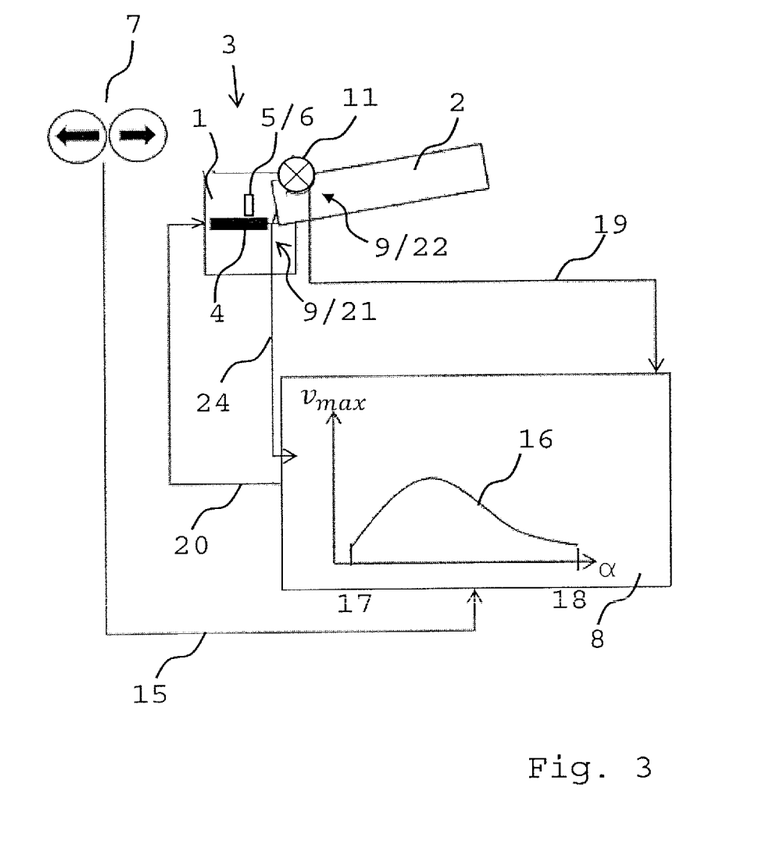
FIG. 3 shows an aircraft seat according to the invention having a direction-dependent operating unit.

FIG. 3 shows a structure of the aircraft seat 3 according to the invention that is substantially identical to that in FIG. 2. The operating unit 7 differs from the operating unit 7 shown in FIG. 2 in that an adjustment direction of the second seat element 2 can be selected by the passenger. This means that it is possible for the second seat element 2 to be adjusted in only a direction selected by the passenger. The adjustment direction of the second seat element 2 can be detected by means of the angle sensor 22, for example. Alternatively or additionally, an additional sensor 9 may also be attached in order to determine the adjustment direction, which sensor is preferably formed by a force sensor 21 and is connected to the open-loop and/or closed-loop control unit 8 by means of an electronic connection 24. Preferably, the force sensor 21 is arranged such that it can detect the counterforce acting on the spring element 4 by means of the second seat element 2. On the basis of this acting force, the open-loop and/or closed-loop control unit 8 can then ascertain in which adjustment direction the second seat element 2 is moving.

The force detected by the force sensor 21 is in particular dependent on the mass of the passenger in the aircraft seat 3, and therefore the open-loop and/or closed-loop control unit 8 is preferably also designed to be calibrated on the basis of the mass of the sitting passenger.

In a variation of the embodiment shown in FIG. 3, a preselection of the adjustment direction by means of the operating unit 7 can be dispensed with. The open-loop and/or closed-loop control unit 8 is in this case designed to identify, on the basis of the force exerted by the passenger on the second seat element 2, in which adjustment direction the second seat element 2 should be adjusted. This can take place, for example, by the second seat element 2 being in the upright position and the passenger pushing against the second seat element 2 with a predetermined force for a predetermined time interval. This counterforce is captured by the force sensor 21 such that the force limitation element 6 or the actuating element 5 is operated by the open-loop and/or closed-loop control unit 8 such that the second seat element 2 can be adjusted.

Furthermore, the force acting on the second seat element 2 by means of the spring element 4 can be preferably set by means of the open-loop and/or closed-loop control element 8 on the basis of the force acting on the second seat element 2 by means of the passenger. If the passenger reduces the force acting on the second seat element 2 by no longer continuing the adjustment movement of the second seat element 2, the open-loop and/or closed-loop control unit 8 detects that a further adjustment movement is no longer wanted. The second seat element 2 is then locked. The passenger can then, as usual, load the second seat element 2 again in the lying position without the second seat element 2 being adjusted. In this case too, the open-loop and/or closed-loop control unit 8 can be designed to be calibrated preferably on the basis of the mass of the passenger.

Figure 4:
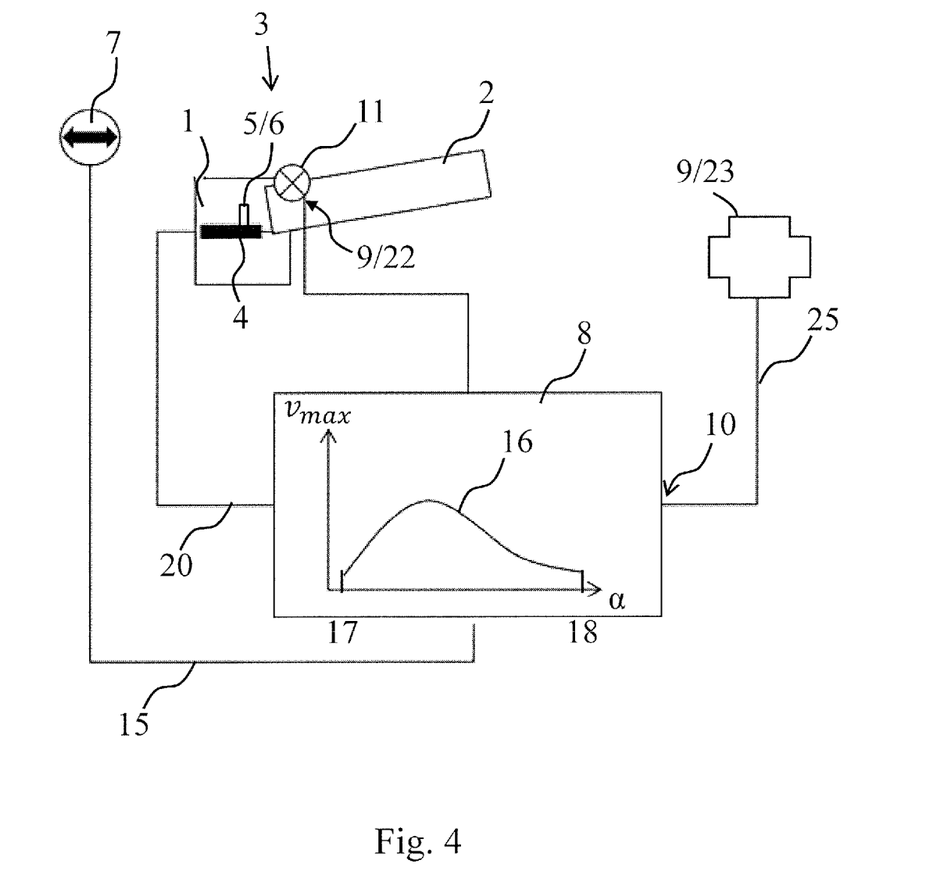
FIG. 4 shows an aircraft seat according to the invention having an open-loop and/or closed-loop control unit having an interface for receiving an external signal from an acceleration sensor.

FIG. 4 shows a further embodiment of the aircraft seat 3 according to the invention, which has substantially the same basic structure as the aircraft seat 3 in the embodiment from FIG. 2. This embodiment in FIG. 4 additionally comprises an interface 10 for receiving external signals. External signals are intended to mean signals or measured variables that are not generated by the aircraft seat 3 itself or do not contain a state variable of the aircraft seat 3.

Preferably, the interface 10 is connected, via an electronic connection 25, to a sensor 9 that is preferably formed by an acceleration sensor 23. The acceleration sensor 23 is preferably designed to detect accelerations of the aircraft. It can thus be ascertained whether the aircraft is in a critical flight phase, for example if turbulences occur during the flight.

The open-loop and/or closed-loop control unit 8 is designed to process the external signal such that the second seat element 2 can no longer be adjusted or can only be adjusted in a predefined direction. In the latter case, preferably only an adjustment movement from the lying position into the safer sitting position would be possible.

Alternatively or additionally, the interface 10 may preferably also be connected to an on-board system of the aircraft. Information present in the on-board system, for example concerning the flight phases, can thereby be transmitted. The open-loop and/or closed-loop control unit could thereby receive information as to whether the aircraft is in the start-up or landing phase, for example. Preferably, by means of the interface 10 a signal could be received that indicates whether the seatbelt signs are activated in the aircraft. The adjustability of the second seat element 2 could therefore also be coupled to the activation or deactivation of the seatbelt signs.

Preferably, blocking of the adjustment movement can be indicated by an external signal, which is transmitted to the open-loop and/or closed-loop control unit 8 via the interface 10, by means of an indicator element on the aircraft seat 3. More preferably, this takes place via an acoustic and/or optical signal, particularly preferably a visual indicator, for example an LED, being integrated in the operating element 7. This indicator indicates to the passenger that the aircraft seat 3 is not malfunctioning, but rather adjustment is not currently possible due to external circumstances. Maintenance measures brought about by unfounded complaints can thus be reduced.

The invention claimed is:

1. An aircraft seat, comprising:
a first seat element;
a second seat element,
wherein the second seat element is mounted so as to be adjustable relative to the first seat element;
a spring element,
wherein the spring element is a gas pressure spring having a first gas pressure chamber and a second gas pressure chamber, and
wherein the spring element moves the second seat element relative to the first seat element;
an actuating element,
wherein the actuating element is a valve configured to interconnect the first gas pressure chamber and the second gas pressure chamber of the gas pressure spring, and
wherein a force applied to the second seat element by the spring element is releasable by the actuating element, such that:
 (i) when the actuating element is in a first switching position of the actuating element, the first gas pressure chamber and the second gas pressure chamber of the gas pressure spring are fluidly separated from each other, and the spring element is deactivated, so that no force is applied to the second seat element by the spring element; and
 (ii) when the actuating element is in a second switching position of the actuating element, the spring element is activated;
a servomotor operatively connected to the valve;
an electronic open-loop/closed-loop control unit,
wherein the electronic open-loop/closed-loop control unit controls the servomotor via an electronic connection to set a switching position of the valve;
a force limitation element,
wherein the force limitation element is configured to selectively limit a magnitude of the force applied to the second seat element by the spring element to a predetermined value, such that intermediate states between the first switching position of the actuating element and the second switching position of the actuating element can be set,
wherein the force limitation element is formed by the actuating element;
wherein the electronic open-loop/closed-loop control unit is configured to operate the force limitation element; and
at least one sensor,
wherein the open-loop/closed-loop control unit is connected to the at least one sensor, and
wherein the at least one sensor captures state variables of the aircraft seat.

2. The aircraft seat according to claim 1,
wherein, in the first switching position of the actuating element, movement of the second seat element relative to the second first seat element is blocked.

3. The aircraft seat according to claim 1, further comprising:
a securing device,
wherein the securing device is configured to selectively block movement of the second seat element relative to the first seat element.

4. The aircraft seat according to claim 1,
wherein the force limitation element is configured to act counter to the force applied to the second seat element by the spring element.

5. The aircraft seat according to claim 1, further comprising:
an operating unit,
wherein the force limitation element is electrically operated by the operating unit.

6. The aircraft seat according to claim 1, wherein the at least one sensor is formed by:

an angle sensor;
a travel sensor;
a force sensor; and/or
an acceleration sensor.

7. The aircraft seat according to any of claim 1, wherein the open-loop/closed-loop control unit comprises:
an interface,
wherein the interface receives external signals.

8. The aircraft seat according to claim 7,
wherein the interface is connected to a proximity sensor.

9. The aircraft seat according to claim 1,
wherein the force limitation element is operated by the open-loop/closed-loop control unit on the basis of:
an adjustment position of the second seat element;
an adjustment speed of the second seat element; and/or
an adjustment acceleration of the second seat element.

10. The aircraft seat according to claim 1,
wherein the force limitation element is operated by the open-loop/closed-loop control unit, such that the spring element only moves in a predefinable direction.

11. A method for adjusting an aircraft seat comprising:
providing an aircraft seat,
wherein the aircraft seat comprises:
a first seat element; and
a second seat element,
wherein the second seat element is mounted so as to be adjustable relative to the first seat element;
a spring element,
wherein the spring element is a gas pressure spring having a first gas pressure chamber and a second gas pressure chamber, and
wherein the spring element moves the second seat element relative to the first seat element;
an actuating element,
wherein the actuating element is a valve configured to interconnect the first gas pressure chamber and the second gas pressure chamber of the gas pressure spring, and
wherein a force applied to the second seat element by the spring element is releasable by the actuating element, such that:
(i) when the actuating element is in a first switching position of the actuating element the first gas pressure chamber and the second gas pressure chamber of the gas pressure spring are fluidly separated from each other, and, the spring element is deactivated, so that no force is applied to the second seat element by the spring element; and
(ii) when the actuating element is in a second switching position of the actuating element, the spring element is activated;
a servomotor operatively connected to the valve;
an electronic open-loop/closed-loop control unit,
wherein the an electronic open-loop/closed-loop control unit controls the servomotor via an electronic connection to set a switching position of the valve;
a force limitation element,
wherein the force limitation element is configured to selectively limit a magnitude of the force applied to the second seat element by the spring element to a predetermined value, such that intermediate states between the first switching position of the actuating element and the second switching position of the actuating element can be set,
wherein the force limitation element is formed by the actuating element,
wherein the electronic open-loop/closed-loop control unit is configured to operate the force limitation element; and
at least one sensor,
wherein the open-loop/closed-loop control unit is connected to the at least one sensor, and
wherein the at least one sensor captures state variables of the aircraft seat;
releasing the force applied to the second seat element by the spring element via the actuating element; and
limiting the force applied to the second seat element by the spring element to a predetermined value via the force limitation element, such that intermediate states between the first switching position of the actuating element and the second switching position of the actuating element can be set.

* * * * *